B. A. MITCHELL.
DRAG CLASSIFIER.
APPLICATION FILED DEC. 15, 1917.

1,354,676.

Patented Oct. 5, 1920.
2 SHEETS—SHEET 1.

Witness:
C. E. Burnap

Inventor
Benjamin A. Mitchell
By Sheridan, Sheridan & Smith, Att'ys

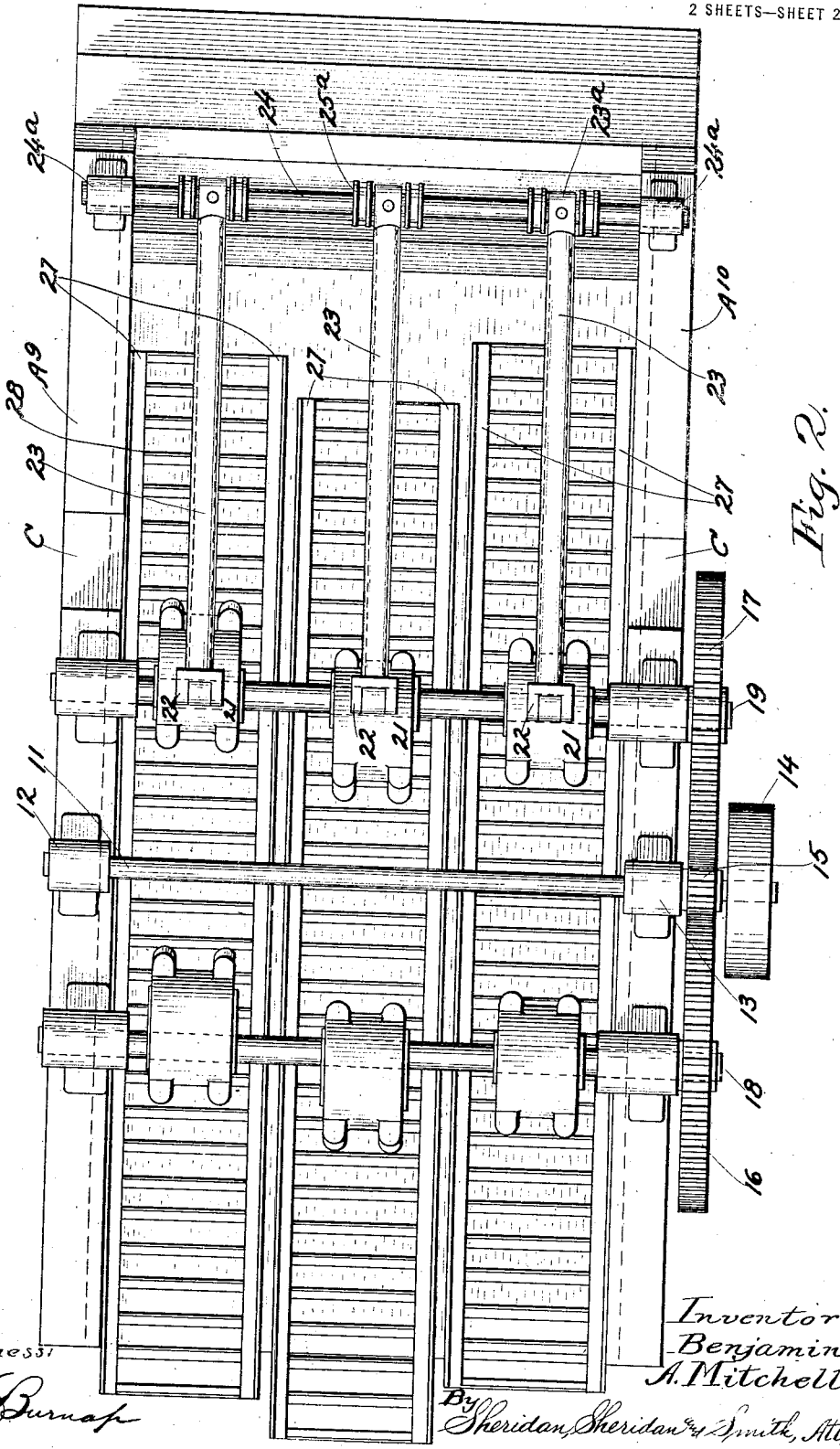

UNITED STATES PATENT OFFICE.

BENJAMIN A. MITCHELL, OF GARFIELD, UTAH.

DRAG-CLASSIFIER.

1,354,676.  Specification of Letters Patent.  Patented Oct. 5, 1920.

Application filed December 15, 1917. Serial No. 207,223.

*To all whom it may concern:*

Be it known that I, BENJAMIN A. MITCHELL, a citizen of the United States, residing at Garfield, in the county of Salt Lake and State of Utah, have invented certain new and useful Improvements in Drag-Classifiers, of which the following is a specification.

This invention relates to improvements in drag-classifiers, and has for its object to provide an apparatus of that nature for use, for example, in separating sands and slimes from a liquid in which they may be suspended.

The main object of my invention consists in providing a balanced set of rake members driven through eccentrics in such wise as to obtain a substantially elliptical motion, in which movement in one direction of the major axis is a drag movement, while movement along the shorter axis is the wasted lift or drop movement so that a substantially long operating stroke can be obtained. These and other objects will be made apparent and set forth in the following specification and shown in the accompanying drawings, in which—

Fig. 2 is a plan view of the apparatus.

Figure 1:
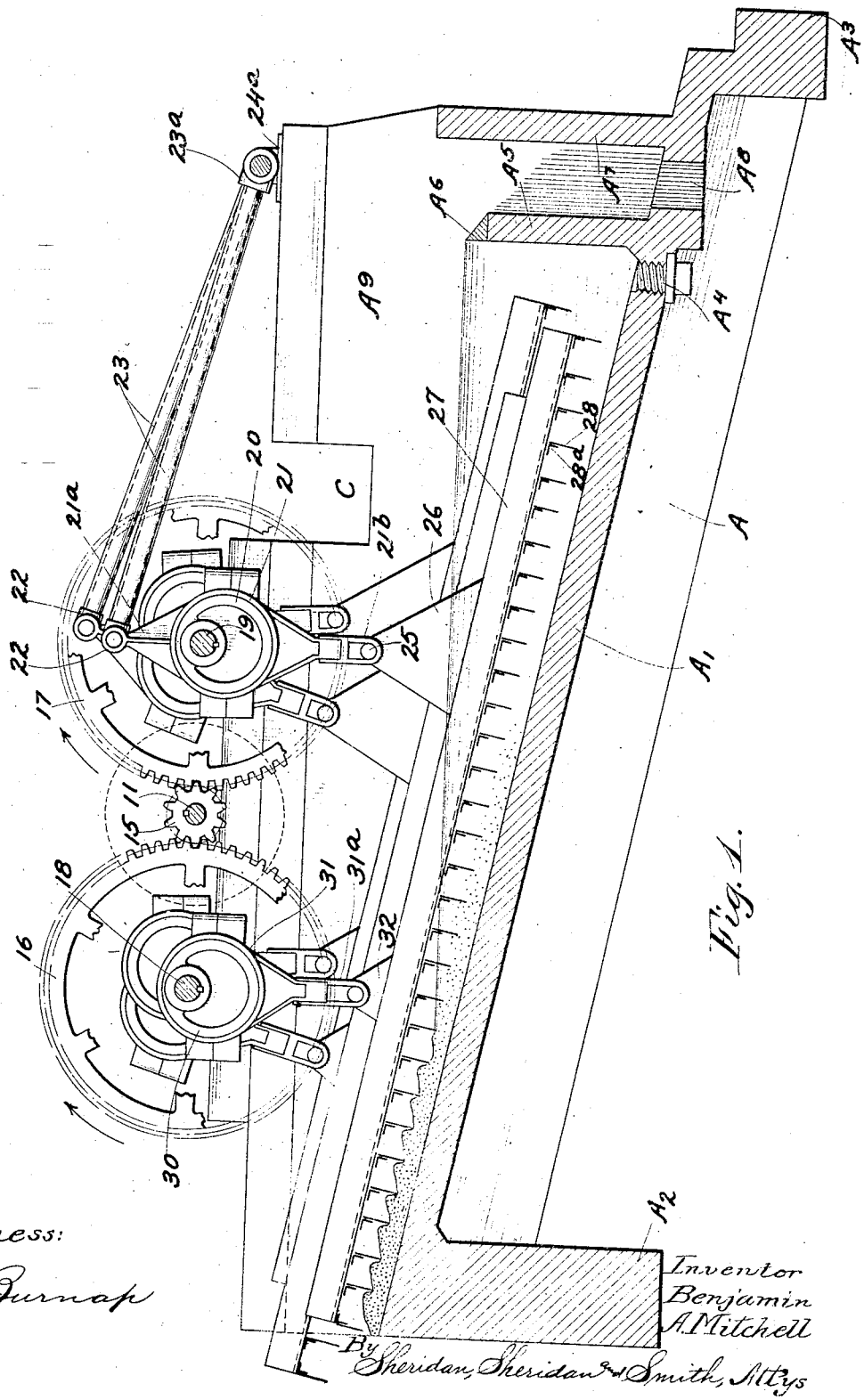
Figure 1 is a side elevation of my apparatus showing the tank in section—.

Like numerals refer to like elements throughout the specification. A represents generally a tank having a sloping bottom A′ and supported upon supports or pedestals $A^2$, $A^3$. A drain aperture $A^4$ is provided at the lowest point of the tank A for use when it is desired to drain the contents therefrom. Adjacent the deeper end of the tank A is provided an upstanding partition or wall $A^5$, provided with an overflow lip $A^6$ at the top thereof. Spaced from the wall $A^5$ at the end of the tank is an end wall $A^7$, a drain outlet $A^8$ being located in the bottom of the tank between the walls $A^5$, $A^7$. $A^9$, $A^{10}$ designate the side walls of the tank.

Extending across between the side walls $A^9$, $A^{10}$ is the main shaft 11 journaled in bearings 12, 13, and carrying at one extremity a belt pulley 14 which may be driven by a belt or similar means, not shown. Carried by the drive shaft 11 is the driving pinion 15 meshing with a pair of larger and equi-sized gears 16 and 17, respectively, which it is apparent will be rotated in the same direction by the pinion 15. The gears 16, 17 are secured to the rotating shafts 18, 19, respectively, which are journaled in suitable bearings upon the side walls $A^9$, $A^{10}$.

Carried by the shaft 19 are a plurality of eccentrics 20—three in number—spaced 120° apart on the shaft 19. Surrounding said eccentrics 20 are strap members 21, having extremities $21^a$, $21^b$ extending upwardly and downwardly, respectively. The extremities $21^a$ are rotatably mounted between the apertured yokes 22 carried at the extremities of radius bars or rods 23, which have their other extremities pivoted through the medium of bearing portions $23^a$ to a rotatable shaft 24 journaled in suitable bearings $24^a$ on the side walls of the tank. Spaced collars $25^a$ are located on each side of the extremities $23^a$ of the rods 23 to prevent their disalinement.

The lower extremities $21^b$ of the eccentric strap members 21 are looped and support lugs 25 carried by flanges 26, which project upwardly from longitudinally extending angle bars 27. Between each pair of angle bars 27 are mounted a plurality of transversely extending rake blades 28 secured by angle irons $28^a$ to the longitudinal angle bars 27. Three sets of rake blades are thereby provided in the form shown, each set being supported through the medium of a pair of flanges 26 extending from the lower extremities of the straps 21, as previously explained.

Carried by the shaft 18 is also a plurality of eccentrics, designated by the numeral 30 and three in number, these eccentrics corresponding in angular position and alinement each with an eccentric 20. In other words, such eccentrics are parallel in motion with the corresponding eccentrics on the shaft 19. Eccentric strap members 31 are mounted upon the eccentrics 30, and are provided with lower extremities $31^a$ corresponding to the extremities $21^b$ of the strap members 21, and they similarly engage outstanding flanges 32 carried by the bars 27. A feed aperture or launder C is provided in the side wall $A^9$ of the tank for the purpose of supplying the fluid mixture of liquid and suspended slimes and sands.

In the operation of my device, when power is applied to the driving pulley 14, and thereby shaft 11, such power is simultaneously transmitted to the gears 16 and 17 through the medium of the pinion 15, resulting in the rotation of shafts 18 and 19 at the same rate of speed and in the same direction of rotation. This driving structure is advantageous not only in providing a more compact structure, but also in positively and directly applying power from the same source simultaneously to both shafts without the necessity for intermediate gearing or gear train.

When the shafts 18, 19 are rotated each pair of parallel eccentrics 30, 20 will rotate in the same direction, and, through the medium of straps 31, 21, will move the suspended drag member 27 carrying the rake blades 28. Were it not for the radius rods 23, as will be apparent, the result would be substantially only a vertical rise and fall of the drag member; but by pivotally attaching the eccentric strap members 21 with their upper extremities 21ª to the radius rods 23 a resulting elliptic motion is obtained, as described above, during which movement a substantially large outward stroke of the members 27 along and approximately parallel to the bottom of the tank results when such members are adjacent the bottom of the tank A¹, while the vertical lift is accomplished in a relatively short interval of time. As is customary with this form of mechanism the outgoing stroke advances the sands and slimes, which have been deposited on or adjacent the bottom of the tank, toward the upper end of the tank, from which they may be scraped by the rake members over the edge of the end wall A² or otherwise disposed of as desired. By equally spacing each trio of eccentrics a distance of 120° apart the driving power required is made substantially uniform or balanced, and I have found that a surprisingly small amount of power will readily operate and actuate the mechanism. As the sands are removed, additional fluid is introduced, either continuously or intermittently as desired, through the launder opening C, and the excess of liquid flows over the lip A⁶ and out through the drain A⁸.

It will be apparent that by varying the length of the eccentric strap arms 21 and changing the position of the shaft 19 intermediate such extremities any desired stroke of the drag member may be obtained.

It will be obvious that numerous changes and modifications may be made in the structure shown without departing from the spirit of my invention, and I do not wish to be restricted to the form shown and described except as defined in the appended claims.

What I claim is:

1. In a device of the class described, a rake member, parallel shafts, means to rotate said shafts, an eccentric carried by each of said shafts, said eccentrics being similarly located on their respective shafts, strap members actuatable by said eccentrics respectively, an extension on one strap member attached to said rake, substantially opposite integral extensions on the other strap member one of which is attached to the rake, and a radius rod attached to the other extension of said last named strap member.

2. In a drag classifier, a tank having an inclined bottom, a rake member operable longitudinally of said tank and adjacent said bottom, a pair of parallel shafts, gear members carried thereby, a common driving pinion meshing with both of said gear members, eccentrics carried by said shafts, and members actuatable by said eccentrics and operatively attached to said rake member.

3. In a drag classifier, a tank having an inclined bottom, an inlet and an outlet for said tank, rake members operable longitudinally of said tank and adjacent said bottom, a pair of rotatable shafts, means for rotating said shafts, a plurality of eccentric members attached to each of said shafts and spaced equi-angular distances apart, and means operatively connecting said eccentrics to said rake members, whereby upon rotation of said shafts said rake members will be alternately operated over the bottom of said tank to advance the sands and slimes therein toward said outlet.

4. In a drag classifier, a tank having an inclined bottom, a rake member operable longitudinally of said tank and adjacent said bottom, parallel shafts, means to rotate said shafts, an eccentric carried by each of said shafts, said eccentrics being similarly located on their respective shafts, eccentric-actuated members operatively attached to said rake and actuated by said eccentrics, and a radius rod pivotally attached to one of said eccentric-actuated members.

5. In a drag classifier, a tank having an inclined bottom, an inlet and an outlet for said tank, parallel rake members spaced apart transversely of said tank and operable longitudinally thereof and adjacent said bottom, said rake members extending substantially from one end of said tank to the other, parallel shafts, means to rotate said shafts, a plurality of eccentrics carried by each of said shafts, the eccentrics on each shaft being spaced equi-angularly and located similarly to the corresponding eccentrics on the other shaft, strap members actuatable by said eccentrics and attached to said rake members, and radius rods pivotally attached to one set of said eccentric strap members, whereby upon rotation of said shafts said rake members will be alternately operated over the bottom of said tank to advance the sands and slimes therein toward said outlet.

In testimony whereof, I have subscribed my name.

BENJAMIN A. MITCHELL.